Oct. 30, 1923.

R. AMBERTON 1,472,405

SPRING RELIEF BOLT AND INCLOSURE EMBODYING SAME

Filed Feb. 17, 1922

INVENTOR:
Richard Amberton
by his attorney
James Hamilton

Patented Oct. 30, 1923.

1,472,405

UNITED STATES PATENT OFFICE.

RICHARD AMBERTON, OF LONDON, ENGLAND.

SPRING RELIEF BOLT AND INCLOSURE EMBODYING SAME.

Application filed February 17, 1922. Serial No. 537,208.

*To all whom it may concern:*

Be it known that I, RICHARD AMBERTON, a subject of the King of Great Britain, and resident of Vauxhall Works, South Lambeth Road, London S. W. 8, England, have invented certain new and useful Improvements in Spring Relief Bolts and Inclosures Embodying Same, for which I have filed patent applications in England dated May 31st, 1921, and September 1st, 1921, respectively, of which the following is a specification.

This invention relates to spring relief bolts, and to cases or inclosures secured with such relief bolts for instruments and apparatus used in coal mines and in other places where risks of explosion or of danger from excessive internal pressures may arise. The cases or inclosures for such purposes are generally referred to as "flame-proof cases". In the construction of such flame-proof cases there are three principal things to be guarded against, as follows:—

1. Rupturing of the case by an internal explosion. This could be guarded against, as far as the case is concerned, by providing outlets or valves which would allow the products of the explosion to escape.

2. Escape of hot gases as a result of an explosion, such gases being hot enough to ignite inflammable gases or dust outside the case. This can be guarded against by cooling the gases as they are escaping from the case in which the explosion has occurred, so, that such gases are rendered innocuous by the time they reach the surrounding atmosphere.

3. The production of a partial vacuum in the case after an explosion, when the gases have cooled again, resulting in inflammable gases leaking back from the outside into the case, and producing a worse explosion when another spark occurs in the case. This could be guarded against by providing the case with suitable valve arrangements which would allow egress of hot gases from the inclosure, but would prevent any gases from being drawn into the inclosure even on the occurrence of a partial vacuum therein.

One object of this invention is to enable inclosures to be made so as to guard against the above-mentioned risks in a simple and effective manner. For this purpose the body and cover of the inclosure are provided with broad machined flanges making intimate contact with each other, so that when bolted together they form a gas-tight joint. Instead, however, of bolting them together rigidly, a strong spring is introduced between the head of each of the bolts and the cover, and suitable distance pieces are provided so that in the event of an explosion occuring inside the inclosure, the whole cover can be raised by the force of the explosion to a limited distance, thus enabling the hot gases to escape through a restricted opening all round the cover. Directly after the pressure is relieved by the escape of the gases, the cover will be closed down tightly again by the action of the springs. The following objects will thus be attained:—

1. The explosion will not rupture the case, as means are provided for allowing the expanded gases to escape.

2. Owing to the fact that only a restricted opening is provided, the gases will be cooled by the broad flanges between which they pass, and will be innocuous by the time they reach the outside atmosphere.

3. Immediately after an explosion, the heavy springs acting upon the cover will force the cover back on to the body of the case, and any partial vacuum inside the inclosure will only tend to hold the cover more tightly pressed upon the flanges of the body, so as to prevent the drawing in of inflammable gases from the outside.

The invention further comprises a particular form of combined bolt and spring in a spring box, which for convenience will hereinafter be termed a relief bolt, this being particularly adapted for use in the manner above described, although it can also be used for holding covers of any inclosures or vessels such as are liable to be subjected to excessve pressures which it is desirable to relieve.

In the accompanying drawing:—

Figure 1:
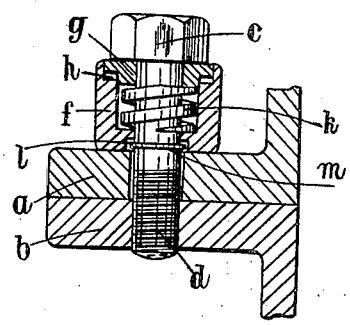
Figure 1 shows in section the flanges of a casing or inclosure with a relief bolt applied thereto.

In Figure 1, *a* and *b* are the broad flanges of a casing or inclosure, these flanges being machined so as to form smooth surfaces where they bear upon one another. The bolt has a head *c* and a shank *d* which in this case is screwed as a stud into a threaded hole in the flange *b*, whilst the shank passes with clearance through a larger hole in the flange $a$. The shank $d$ of the bolt may be made longer and held by a nut $e$, Figure 2, when required. A spring box $f$ is provided consisting of a cup-shaped member with an aperture therein through which the plain part of the shank $d$ of the bolt passes, the shank having a snug but sliding fit in this aperture. Under the head $c$ of the bolt is fitted a washer $g$ which slides in the top of the cup-shaped spring box $f$, and in order to form a stop this washer is stepped, as is also the top of the spring box, so that normally an annular gap or space is left at $h$, allowing the spring box $f$ to move upwards when the spring is compressed by the depth of this gap. The outer circumference of the washer $g$ can slide in the recess of larger diameter turned in the top of the spring box $f$, while the smaller diameter of the washer $g$ makes a good sliding fit in the interior of the spring box. The spring $k$ is put inside the spring box around the shank $d$ of the bolt and tending to press up the bolt with respect to the spring box, as the lower end of the spring bears on the bottom of the spring box and the upper end of the spring bears on the washer $g$ pressing against the head $c$ of the bolt. In order that these parts may be assembled on the bolt and sent out for fitting and use in that form, the bolt is preferably grooved in its plain shank portion and the bottom of the spring box is recessed at $l$ as shown in Figure 1, the groove and this recess being so situated that when the parts are assembled and the spring is compressed, the groove on the stem of the bolt is just clear of the bottom of the spring box. A wire ring $m$ is then forced or sprung into place in the groove and it normally lies in the recess $l$ in the bottom of the spring box holding this member $f$ together with the spring $k$ and washer $g$ assembled on the bolt.

Bolts with the spring boxes applied thereto as above described can be made up and sold for application to any existing casings in which there are broad flanges normally bolted close together. In applying the bolts they should be tightened up until the top of the washer $g$ is in a particular position in relation to the top of the spring box $f$, and it is convenient to arrange that the top of the washer $g$ should normally be flush with the top edge of the spring box when the spring has been sufficiently compressed to hold the cover tightly in place, as in Figure 1. Before the bolts are applied, the washers $g$ will then project somewhat above the tops of the spring boxes $f$ by an amount depending on the position of the rings $m$ and the depth of the recesses $l$; the washer is shown as projecting in this way in Figure 2. When the cover is held by relief bolts applied as in Figure 1, if an explosion in the case occurs tending to force the flanges $a$ and $b$ apart, the upper flange $a$ can lift the spring box $f$ against the action of the spring $k$ as far as is allowed by the co-acting shoulders of the spring box and the washer $g$, that is to say by a distance corresponding to the depth of the gap $h$. The outward or upward movement of the cover of the casing by compression of the springs on the bolts is thus strictly limited to an amount which will insure that any heated gases passing over the broad surfaces of the flanges $a$ and $b$ will be effectively cooled so that there will be no risk of explosion when they escape.

An important feature of the invention is that the spring $k$ is enclosed in a substantially dust-proof casing so that there is no risk that the operation of the device will be spoilt by accumulations of dust and dirt such as might occur if exposed springs under the heads of bolts were used. The two circumferential surfaces at which the washer $g$ fits and works in the stepped top of the spring box, the contact surfaces between the shank $d$ and the aperture in the bottom of the spring box, and the contact surfaces between the under face of the spring box and the top of the flange $a$ on which it rests, all form efficient joints insuring the practical exclusion of dirt and moisture. Hence, even if the whole of the bolt head were caked up with mud or the like, this would not interfere with the efficient operation of the device.

Figure 2:
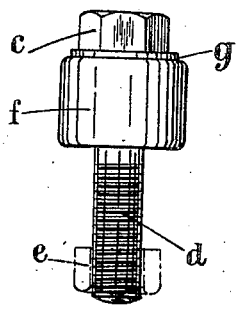
Figure 2 shows a relief bolt in elevation.

The springs $k$ which are used will generally be stout spiral springs of not more than two or three turns, as indicated in Figure 1. Their ends may be chamfered off as in Fig. 1, and they will serve as spring washers tending to prevent unscrewing of the bolts with respect to their casings. The bolts can be tested for strength of the spring and freedom of movement with their springs assembled in the spring boxes, after which the wire rings $m$ sprung or forced on the shanks of the bolts will insure that the assemblage and adjustment are not interfered with under normal conditions before the bolts are used. Before use, the springs normally cause the washers $g$ under the bolt heads to stand up proud of the tops of the spring boxes as shown in Fig. 2, so that in tightening the bolts the tightening is continued until the washer tops are flush with the tops of the spring boxes.

Although relief bolts as hereinbefore described are primarily useful on casings of instruments employed in coal mines and the like, yet their use is not limited to this purpose but they may be applied to the covers of casings of any kind which are liable to excess pressure and in which it is desirable to relieve this pressure when it arises without disturbing the normal gas-tight closure of the casings. Any required number of the relief bolts may be applied to the cover which is to be allowed to be lifted by the excess pressure.

Having thus described my invention what I claim as new and desire to secure by Letters Patent is:—

1. A relief bolt adapted for use in holding together the parts of an inclosure liable to damage by excess pressure, said bolt comprising a shank formed with a head, a spring surrounding the shank of said bolt, a spring box surrounding said spring and means for allowing a limited movement of said spring box toward the head of the bolt on compression of said spring.

2. A relief bolt adapted for use in holding together the parts of an inclosure liable to damage by excess pressure, said bolt comprising a shank formed with a head, a washer fitting upon said shank and bearing against said head, said washer having an annular stepped face, a spring surrounding the said shank and bearing against said washer, a spring box surrounding said spring and slidably fitting upon a plain portion of the said shank, the outer face of said spring box being formed with an annular recessed step such that the outer diameter of said washer will fit in the recessed step of the spring box, and means for normally retaining said spring box upon said shank in a position such that the washer projects partially beyond the end surface of the spring box.

3. A relief bolt adapted for use in holding together the parts of an inclosure liable to damage by excess pressure, said bolt comprising a shank formed with a head, a washer fitting upon said shank and bearing against said head, said washer having an annular stepped face, a spring surrounding the said shank and bearing against said washer and a spring box surrounding said spring and slidably fitting upon a plain portion of the said shank, the outer face of said spring box being formed with an annular recessed step such that the outer diameter of said washer will fit in the recessed step of the spring box, the depth of the recessed step in said spring box being such that when the bolt is tightened the outer face of said washer may be flush with the end face of said spring box, while on occurrence of excess pressure tending to lift said spring box upon said shank, the spring box can lift further to a limited extent over said washer.

4. The combination with a shank having a head and means of engagement for securing the free end of said shank to any member to which it is required to be applied, of a spring box and a washer adapted to fit slidably in one end of said spring box, and a spring accommodated in said spring box, said spring being of such dimensions as to tend to press apart the said washer and spring box, said spring box and washer with the said spring enclosed in the spring box being adapted to fit slidably upon the said shank and said washer and spring box being so formed as to limit the extent to which they can be forced together on compression of said spring.

5. The combination with an inclosure having broad flat opposed flanges between one part thereof and another part, of means for holding together said two flanges of said inclosure, such means comprising a shank with a head thereon, the free end of said shank being adapted to be secured in the one flange while the shank passes freely through an aperture in the other flange, and a spring box fitting slidably upon said shank, a spring in said spring box, and a member adapted to engage between the head of said shank and the said spring, said member forming a sliding fit in the end of said spring box, and being adapted to limit the degree of separation of said flanges when forced apart by coming to rest against a face of said spring box after a certain amount of compression of said spring.

6. A casing or inclosure subject to internal explosions or excessive pressures comprising the combination with a body portion made in a plurality of parts with broad flat flanges on one part adapted to bear against broad flat flanges on another part, of spring connecting means for said flanges comprising a connecting member, a spring carried by said connecting member in such a manner as normally to press said flanges together to make a gas tight joint between them and means for exerting a positive stop action preventing complete compression of said spring and the consequent separation of said flanges to a small amount relatively to the breadth of said flanges to ensure effective cooling of any escaping heated gases.

RICHARD AMBERTON.